(12) United States Patent
Kawajiri et al.

(10) Patent No.: US 9,957,626 B2
(45) Date of Patent: May 1, 2018

(54) HYDROGEN PRODUCTION SYSTEM AND METHOD FOR PRODUCING HYDROGEN

(71) Applicant: KABUSHIKI KAISHA TOSHIBA, Minato-Ku (JP)

(72) Inventors: Yuko Kawajiri, Yokohama (JP); Hisao Watanabe, Yokohama (JP); Ryoji Yoshimura, Kawasaki (JP); Seiji Fujiwara, Kamakura (JP); Hiroyuki Yamauchi, Yokohama (JP); Masafumi Komai, Yokohama (JP); Masahiko Yamada, Setagaya (JP); Tsuneji Kameda, Ota (JP); Masato Yoshino, Yokohama (JP); Takatoshi Asada, Yokohama (JP); Shigeo Kasai, Kamakura (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 446 days.

(21) Appl. No.: 14/837,411

(22) Filed: Aug. 27, 2015

(65) Prior Publication Data

US 2016/0060776 A1    Mar. 3, 2016

(30) Foreign Application Priority Data

Sep. 2, 2014   (JP) .................................. 2014-178087

(51) Int. Cl.
*C25B 1/04*     (2006.01)
*C25B 9/18*     (2006.01)
(Continued)

(52) U.S. Cl.
CPC ................ *C25B 15/02* (2013.01); *C25B 1/04* (2013.01); *C25B 9/00* (2013.01); *C25B 9/18* (2013.01); *C25B 15/08* (2013.01); *Y02E 60/366* (2013.01)

(58) Field of Classification Search
CPC ........... C25B 9/18; C25B 15/02; C25B 15/08; C25B 1/04–1/12
See application file for complete search history.

(56) References Cited

U.S. PATENT DOCUMENTS

2013/0317959 A1\* 11/2013 Joos ........................ C25B 15/02
                                                                  705/34
2015/0368818 A1\* 12/2015 Pedersen ................... C25B 1/04
                                                                  204/267
2017/0175277 A1\*  6/2017 von Olshausen ......... C25B 1/12

FOREIGN PATENT DOCUMENTS

JP        06-173053      6/1994
JP        2007-314833    12/2007

\* cited by examiner

*Primary Examiner* — Nicholas A Smith
(74) *Attorney, Agent, or Firm* — Oblon, McClelland, Maier & Neustadt, L.L.P.

(57) ABSTRACT

A hydrogen production system that achieves highly-efficient hydrogen production even when hydrogen is produced by using the plurality of cell stacks is provided.

A hydrogen production system includes a plurality of cell stacks provided within a reaction containment, the cell stacks generating hydrogen by high temperature steam electrolysis by supplying steam to the plurality of cell stacks, a first flow path guiding the steam to each of the cell stacks, a second flow path causing a carrier gas containing air as a main component to flow into the reaction containment, and a flow regulation device provided at an inlet of the steam in each of the cell stacks, the flow regulation device regulating a flow rate of the steam caused to flow into each of the cell stacks to be uniform.

11 Claims, 10 Drawing Sheets

(51) Int. Cl.
*C25B 15/02* (2006.01)
*C25B 15/08* (2006.01)
*C25B 9/00* (2006.01)

HYDROGEN PRODUCTION SYSTEM AND METHOD FOR PRODUCING HYDROGEN

CROSS-REFERENCE TO RELATED APPLICATION

This application is based upon and claims the benefit of priority from Japanese Patent application No. 2014-178087, filed on Sep. 2, 2014, the entire content of which is incorporated herein by reference.

BACKGROUND OF THE INVENTION

Field of the Invention

Embodiments of the present invention relate to a field for producing hydrogen in which hydrogen is generated by using high temperature steam electrolysis.

Related Art

Realization of a hydrogen energy society using hydrogen as an energy medium has attracted attention. As one of technology for producing hydrogen, a high temperature steam electrolysis is widely known. The high temperature steam electrolysis is a method in which hydrogen and oxygen are generated by electrolyzing steam with a high temperature (normally, 500° C. or more).

The method can advantageously reduce an amount of electricity required for electrolysis by electrolyzing steam under a high temperature environment.

To be more specific, a hydrogen electrode and an oxygen electrode are provided on both sides of a solid oxide electrolyte to constitute an electrolytic cell. High temperature steam is supplied to the hydrogen electrode side, and an electrolytic voltage is applied to the both electrodes, so that the steam is decomposed into hydrogen and oxygen.

Also, by supplying hydrogen and oxygen to a hydrogen electrode and an oxygen electrode of an electrolytic cell, respectively, and reacting hydrogen and oxygen, a reverse reaction of the high temperature steam electrolysis (a fuel cell reaction) takes place, so that electric power can be generated.

Conventionally, various apparatus configurations for achieving high durability and highly-efficient hydrogen production, such as a configuration for suppressing a gas leak between both electrodes, have been disclosed for the electrolytic cell that performs the high temperature steam electrolysis (for example, Japanese Patent Laid-Open Nos. 1994-173053 and 2007-314833).

In a hydrogen station that produces and stores a large volume of hydrogen, the high temperature steam electrolysis is performed in the reaction containment where a plurality of cell stacks in each of which a plurality of electrolytic cells are stacked are arranged. In this case, it is necessary to evenly perform an electrolytic reaction in each of the arranged cell stacks in order to obtain higher hydrogen production efficiency.

However, as the number of the arranged cell stacks is increased, the reaction containment becomes large, and a configuration inside the containment becomes complicated. Therefore, it becomes difficult to supply steam used for the electrolytic reaction to uniformly flow into each of the cell stacks. If the steam to be supplied into each of the cell stacks does not keep uniform, the electrolytic reactions are not evenly performed in the cell stacks, and the hydrogen production efficiency is lowered.

If flow rates of the steam flowing into the cell stacks become uneven, and the steam becomes deficient (steam starvation state) in some of the cell stacks, the electrolytic reaction cannot be stably continued, and the electrolytic cell may be damaged.

SUMMARY OF THE INVENTION

To solve the problems described above, it is the object of the present invention to provide a technique for producing hydrogen that achieves highly-efficient hydrogen production even when hydrogen is produced by using the plurality of cell stacks.

A hydrogen production system according to an embodiment of the present invention includes a plurality of cell stacks that are installed in a reaction containment, the cell stacks generating hydrogen by high temperature steam electrolysis by supplying steam to the plurality of cell stacks, a first flow path guiding the steam to each of the cell stacks, a second flow path causing a carrier gas containing air as a main component to flow into the reaction containment, and a flow regulation device provided at an inlet of the steam in each of the cell stacks, the flow regulation device regulating a flow rate of the steam supplied into each of the cell stacks to be uniform.

A method for producing hydrogen by using a plurality of cell stacks that are provided within a reaction containment, and generate hydrogen by high temperature steam electrolysis by causing steam to flow into the plurality of cell stacks according to an embodiment of the present invention comprises the steps of: guiding the steam to each of the cell stacks; causing a carrier gas containing air as a main component to flow into the reaction containment; and regulating a flow rate of the steam caused to flow into each of the cell stacks to be uniform by using a flow regulation device that is provided at an inlet of the steam in each of the cell stacks.

DESCRIPTION OF THE EMBODIMENTS

First Embodiment

Hereinafter, embodiments of the present invention are described based on the accompanying drawings.

Figure 1:
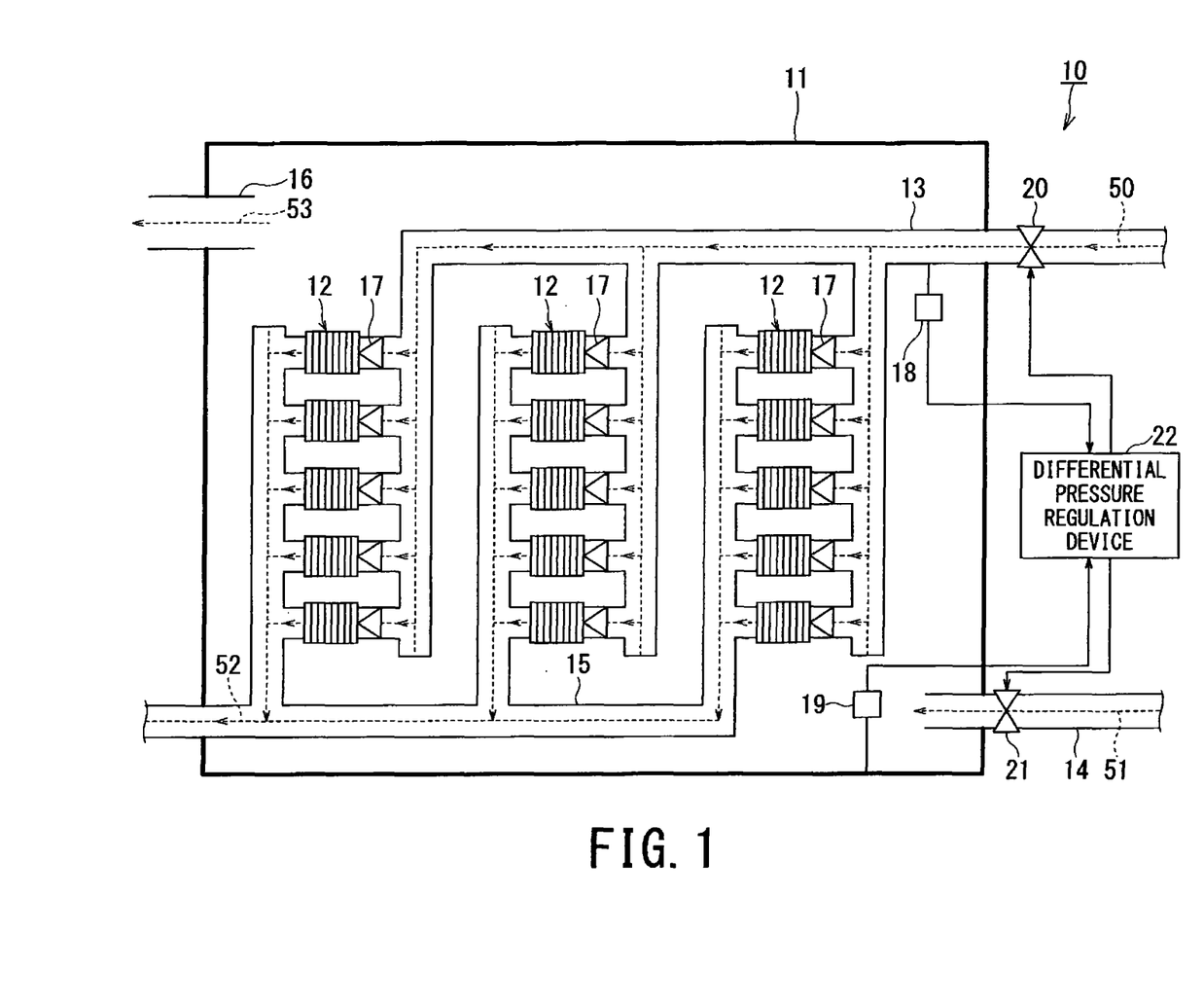
FIG. 1 is a configuration diagram of a hydrogen production system according to a first embodiment.

As shown in FIG. 1, a hydrogen production system 10 according to a first embodiment includes a plurality of cell stacks 12, a first flow path 13, a second flow path 14, and a flow regulation device 17. The plurality of cell stacks 12 are provided within a reaction containment 11, and generate hydrogen by high temperature steam electrolysis by supplying steam 50 into the plurality of cell stacks 12. The first flow path 13 guides the steam 50 to each of the cell stacks 12. The second flow path 14 causes carrier gas 51 containing air as a main component to flow into the reaction containment 11. The flow regulation device 17 is provided at an inlet of the steam 50 so as to regulate a flow rate of the steam 50 caused to flow into each of the cell stacks 12 to be uniform.

Although a configuration in which the first flow path 13 is branched and connected to five cell stacks 12 that are arranged in parallel with each other is shown in FIG. 1, the number of the cell stacks 12 and an arrangement thereof are not limited to those of the configuration.

The first flow path 13 is inserted into the reaction containment 11, and is branched to be connected to the respective cell stacks 12.

The first flow path 13 causes the steam 50, which is generated by a steam generator (not shown) and heated to a set temperature, to flow into the reaction containment 11. The first flow path 13 divides the flow of the steam 50 and guides the steam 50 to the respective cell stacks 12.

The flow regulation device 17 is provided at the inlet through which the steam 50 flows into each of the cell stacks 12 from the first flow path 13 (a connection port between the first flow path 13 and each of the cell stacks 12). The flow regulation device 17 regulates the flow rate of the steam 50 flowing into each of the cell stacks 12 to be uniform.

Examples of the flow regulation device 17 include an orifice plate having a small hole for regulating a fluid flow rate, and a barrier that is a structure for restricting a fluid flow rate. It is not necessary to make shapes of all of the flow regulation devices 17 equal to each other in the cell stacks 12. The shape of the flow regulation device 17 may be appropriately adjusted in each of the cell stacks 12 so as to make uniform the steam rate flowing into each of the cell stacks 12.

For example, when the orifice plate is used as the flow regulation device 17, diameters of the small holes of all of the orifice plates are not made equal to each other in the cell stacks 12. The diameter of the small hole is adjusted such that the flow rate of the steam 50 flowing into each of the cell stacks 12 becomes uniform by, for example, decreasing the diameter in the orifice plate located on an upstream side of the flow path where the flow rate of the steam 50 is large, and increasing the diameter in the orifice plate located on a downstream side of the flow path where the flow rate of the steam 50 is small.

The second flow path 14 is provided so as to be inserted into the reaction containment 11. The second flow path 14 causes the carrier gas 51 containing air as a main component to flow into the reaction containment 11 from an opening end of the flow path. In the carrier gas 51, steam may be used instead of air.

Each of the cell stacks 12 is formed in a stacked structure by stacking a plurality of electrolytic cells in each of which a solid oxide electrolyte (not shown) is arranged in a center, and a hydrogen electrode and an oxygen electrode are formed on both sides of the solid oxide electrolyte. Each of the cell stacks 12 is supplied with electric power from outside, and performs the high temperature steam electrolysis to generate hydrogen and oxygen from the steam.

A hydrogen outlet path 15 causes hydrogen 52 generated in the respective cell stacks 12 to join each other and flow out of the reaction containment 11. The hydrogen 52 generated in the cell stacks 12 also includes unreacted steam.

On the other hand, an oxygen outlet path 16 causes oxygen 53 generated in the respective cell stacks 12 to flow out of the reaction containment 11.

By making uniform the flow rate of the steam 50 flowing into each of the cell stacks 12 by the flow regulation device 17, an electrolytic reaction can be uniformly performed in each of the cell stacks 12. High hydrogen production efficiency can be thereby achieved. By making the flow rate of the steam 50 uniform, steam starvation caused by unevenness of the steam flow rate is also suppressed. Therefore, a hydrogen production operation can be stably performed, and high durability of the hydrogen production system 10 is improved.

Figure 2:
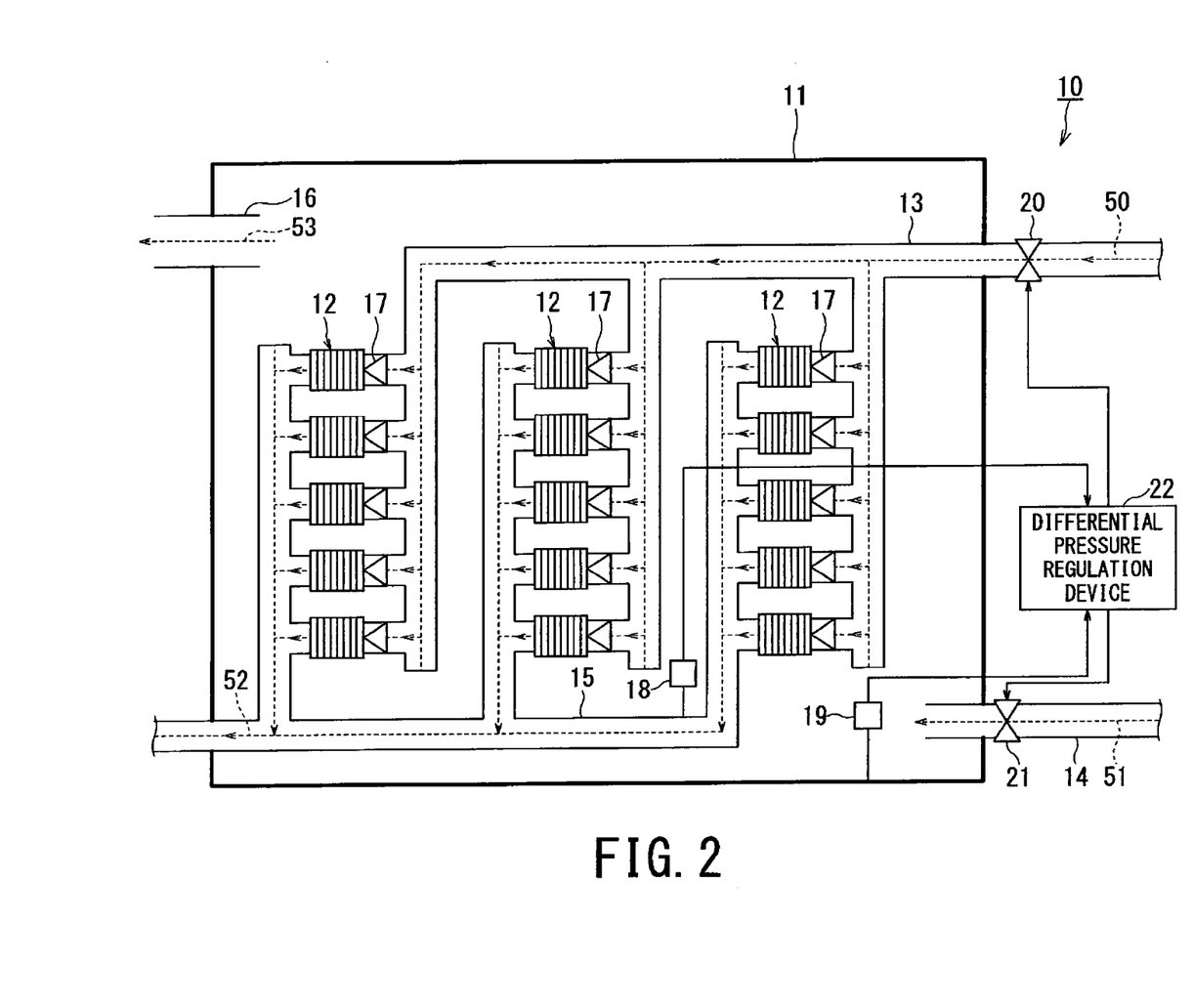
FIG. 2 is a configuration diagram illustrating a modification of the hydrogen production system according to the first embodiment.

A first pressure sensor 18 measures a pressure inside the first flow path 13. Accordingly, a pressure inside the cell stacks 12 can be monitored. The first pressure sensor 18 may measure a pressure inside the hydrogen outlet path 15 to monitor a pressure inside the cell stacks 12 as shown in FIG. 2.

A second pressure sensor 19 measures a pressure inside the reaction containment 11. Accordingly, a pressure outside the cell stacks 12 can be monitored. FIG. 1 shows merely one example of a method for installing the respective pressure meters. Since the reaction containment 11 has a high temperature, it is desirable that the respective pressure meters are installed outside the reaction containment 11 by drawing a cable for measuring a pressure out of the reaction containment 11.

A first flow control valve 20 is a regulation valve that is provided in the first flow path 13 to regulate a flow rate of the steam 50 flowing through the first flow path 13.

A second flow control valve 21 is a regulation valve that is provided in the second flow path 14 to regulate a flow rate of the carrier gas 51 flowing through the second flow path 14.

Examples of the first flow control valve 20 and the second flow control valve 21 include a motor operated valve, an air operated valve, a hydraulic operated valve, and an electromagnetic valve.

Values of the pressures measured in the first pressure sensor 18 and the second pressure sensor 19 are inputted into a differential pressure control device 22. The differential pressure control device 22 calculates a differential pressure between an inside and an outside of the cell stacks 12 based on the two pressure values, and determines whether or not the calculated differential pressure has a predetermined pressure value (for example, a few Pa) or less.

When the calculated differential pressure is larger than the predetermined pressure value, the differential pressure control device 22 regulates the respective flow rates of the steam 50 and the carrier gas 51 by using the first flow control valve 20 and the second flow control valve 21 so as to make the differential pressure equal to or less than the predetermined pressure value.

Since solid oxide films of the electrolytic cells constituting the cell stacks 12 are very thin, the solid oxide films may be damaged if the differential pressure between the inside and the outside of the cell stacks 12 is large. Since the differential pressure between the inside and the outside of the cell stacks 12 is kept low by the differential pressure control device 22, the damage to the cell stacks 12 can be prevented, and the high durability of the hydrogen production system 10 is improved.

Furthermore, by making a pressure drop of the steam 50 caused by the flow regulation devices 17 larger than a pressure drop caused by flow resistance of cell stacks 12, it is possible to distribute the steam 50 uniformly to the respective cell stacks 12.

When the pressure drop of the steam 50 caused by the flow regulation devices 17 is increased, the pressure inside of the first flow path 13 is needed to be increased to secure flow rate of predetermined steam 50. At this time, by the operation of differential pressure control device 22, the pressure inside the reaction containment 11 (the pressure outside the cell stacks 12) rises. That is, the pressure between the inside and the outside of the cell stacks 12 are highly maintained. This allows the cell stacks 12 to be durable.

The fluctuation of flow rate of the steam 50 supplied into each of the cell stacks may influence electrolytic reaction efficiency. By making a pressure drop of the steam 50 caused by the flow regulation devices 17 larger than a pressure drop caused by flow resistance of the cell stacks 12, the influence by the flow resistance of the cell stacks 12 can be reduced, and the steam can be supplied uniformly into the cell stacks 12. Therefore, the electrolytic reaction can be more efficiently performed in each of the cell stacks 12.

Figure 3:
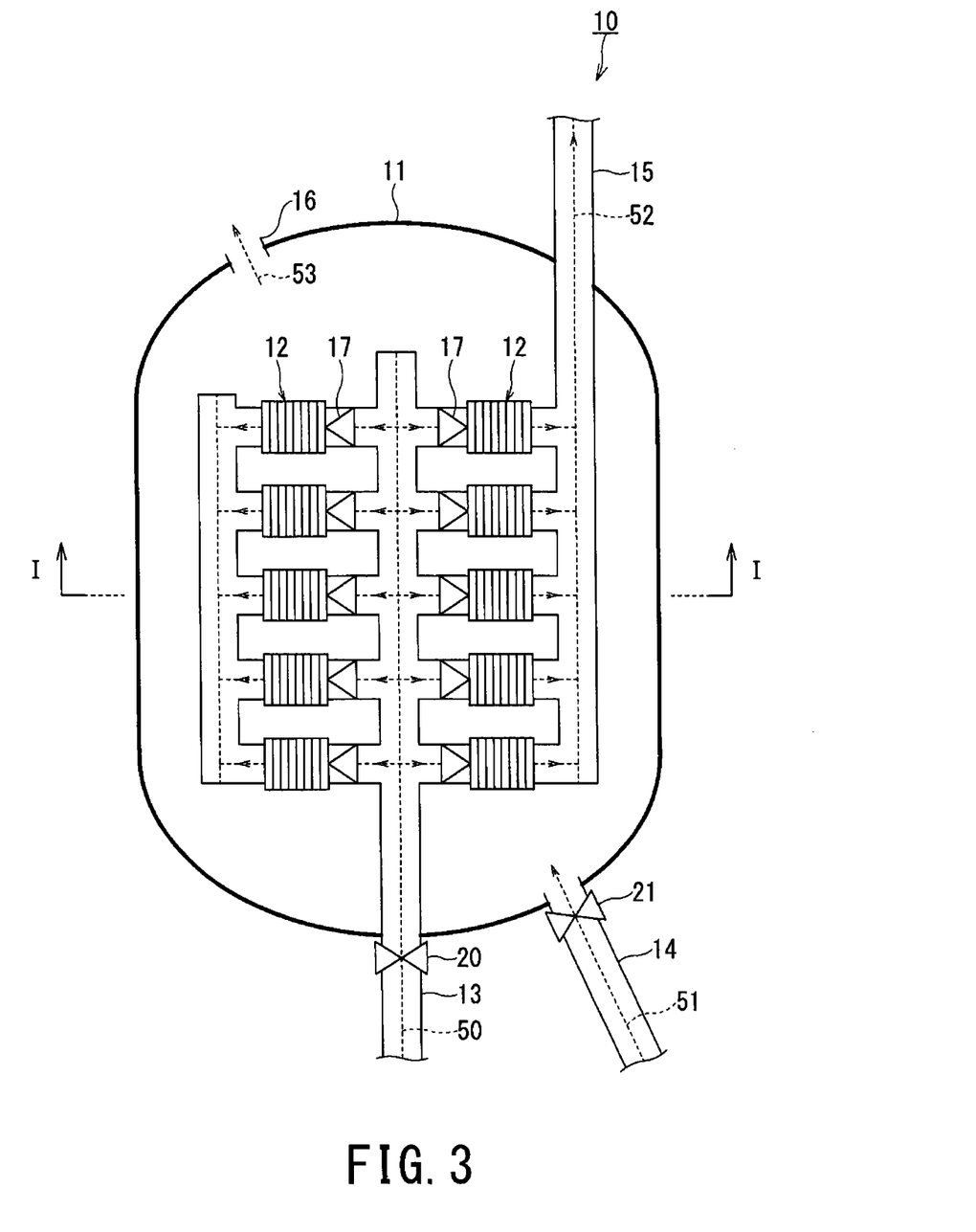
FIG. 3 is a configuration diagram illustrating a modification of the hydrogen production system according to the first embodiment.
Figure 4:
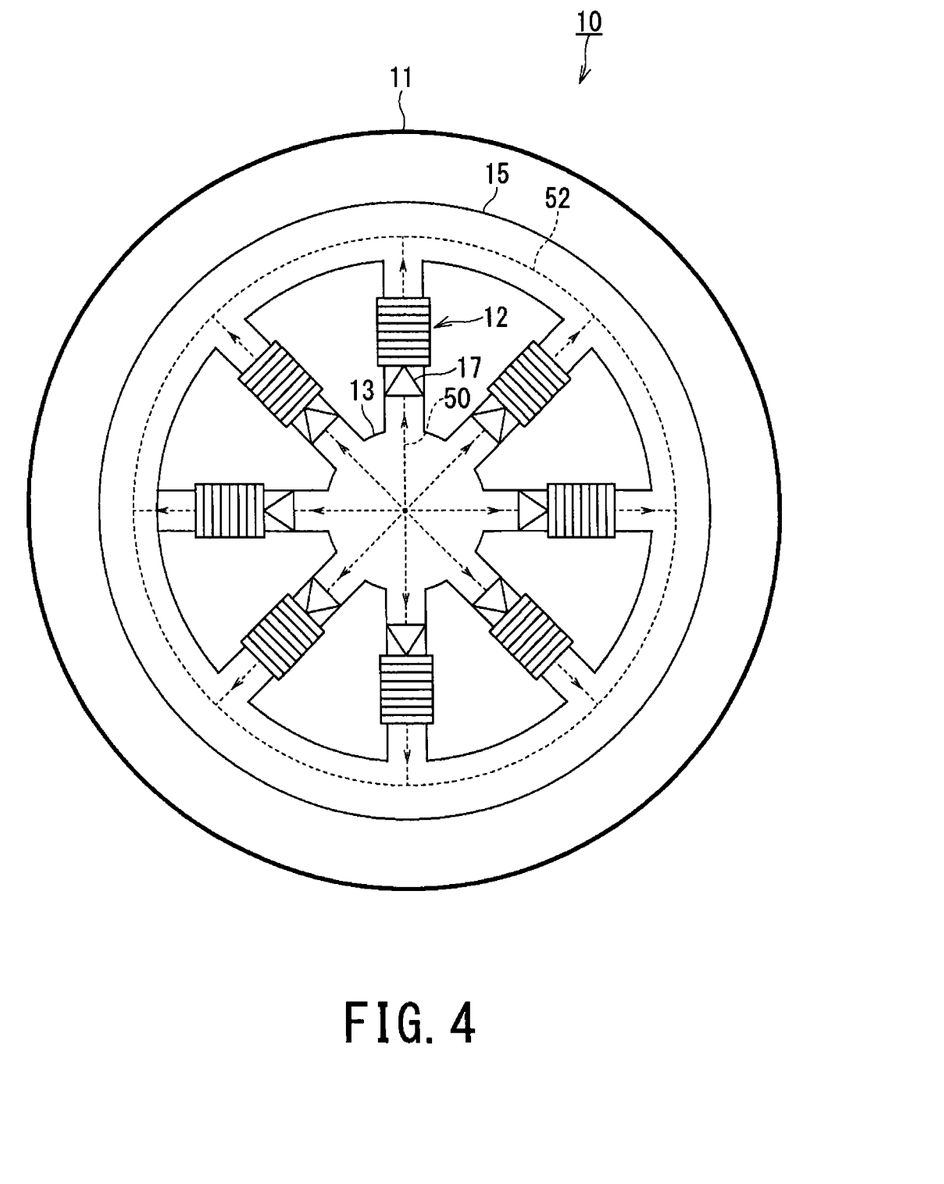
FIG. 4 is an I-I sectional view of the hydrogen production system shown in FIG. 3.

FIG. 3 shows a modification of the hydrogen production system 10 according to the first embodiment. FIG. 4 is an I-I sectional view of the hydrogen production system 10. Here, a portion of a configuration shown in FIG. 1, such as the differential pressure control device 22, is omitted.

The cell stacks 12 are radially arranged within the reaction containment 11 that is formed in a cylindrical shape. The first flow path 13 inserted from a lower portion of the reaction containment 11 is branched toward the respective cell stacks 12 from a center of the radially-arranged cell stacks, and connected to the respective cell stacks 12.

The steam 50 is guided to each of the cell stacks 12 by the first flow path 13, and caused to flow into each of the cell stacks 12 via the flow regulation device 17. Each of the cell stacks 12 performs the high temperature steam electrolysis to generate hydrogen from the steam. The generated hydrogen 52 is caused to flow out of the reaction containment 11 through the hydrogen outlet path 15 that is formed in a ring shape.

By employing a configuration as described above, the division number of the steam 50 in the first flow path 13 is decreased as compared to the configuration shown in FIG. 1. Thus, it is possible to reduce a pressure drop in the first flow path 13, and make the hydrogen production system 10 compact.

Second Embodiment

Figure 5:
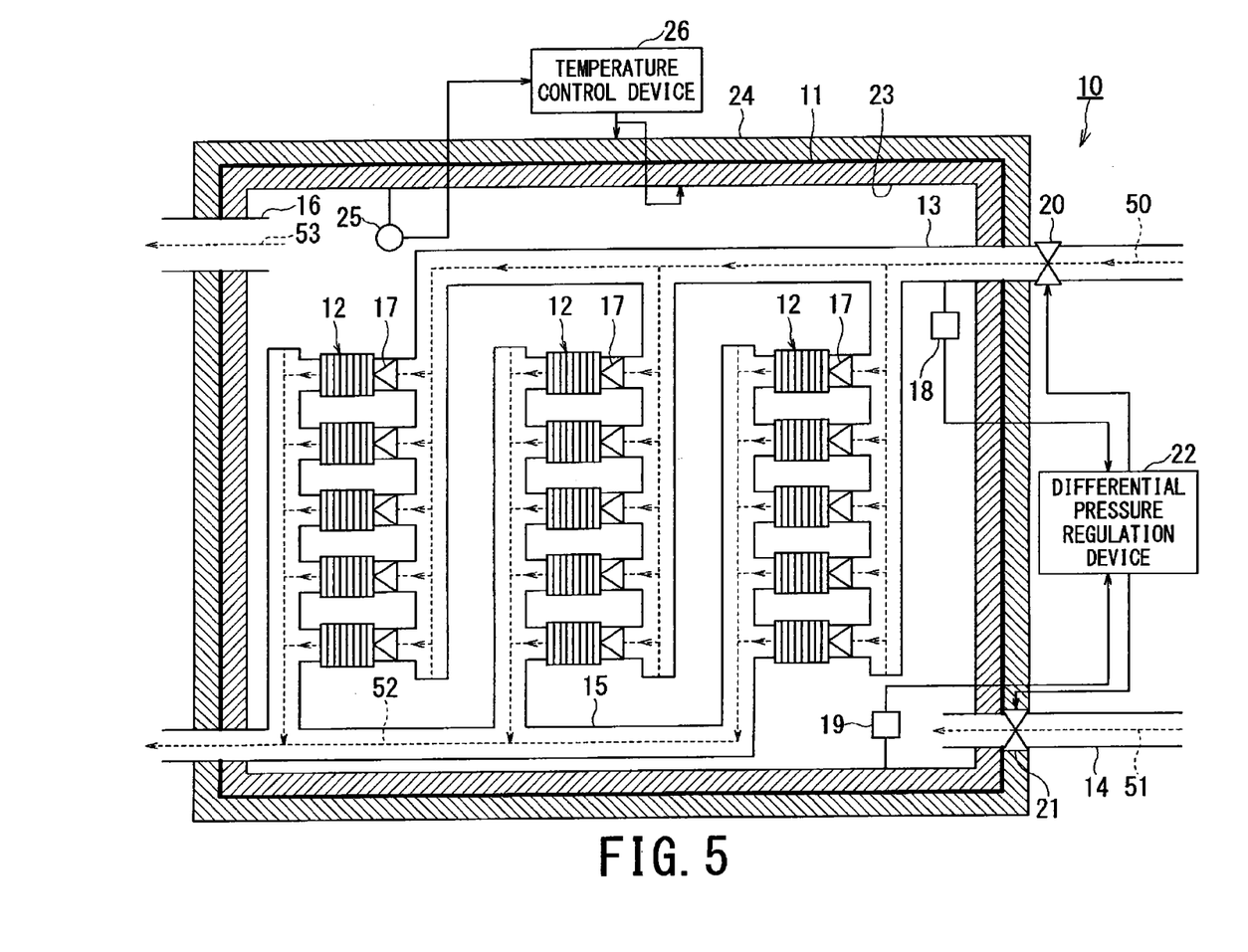
FIG. 5 is a configuration diagram of a hydrogen production system according to a second embodiment.

FIG. 5 is a configuration diagram of the hydrogen production system 10 according to a second embodiment. Note that components and portions corresponding to those of the first embodiment (FIG. 1) are assigned same reference numerals, and an overlapping description is omitted.

A thermometer 25 is provided in the reaction containment 11, and measures an internal temperature of the reaction containment 11.

An internal heating device 23 is a heater that is provided on an inner peripheral surface of the reaction containment 11 to heat an inside of the reaction containment 11.

An external heating device 24 is a heater that is provided on an outer peripheral surface of the reaction containment 11 to heat the inside of the reaction containment 11.

The measured internal temperature of the reaction containment 11 is inputted into a temperature control device 26 from the thermometer 25. The temperature control device 26 determines whether or not the internal temperature of the reaction containment 11 is a predetermined temperature (a temperature at which the cell stacks 12 exert performance).

When the measured internal temperature is not the predetermined temperature, the temperature control device 26 adjusts the internal temperature of the reaction containment 11 to be the predetermined temperature by using the internal heating device 23 and the external heating device 24.

If the reaction containment 11 is not held at the predetermined temperature, a difference in reaction efficiency may be generated in the respective cell stacks 12. By maintaining the inside of the reaction containment 11 at the constant temperature by the temperature control device 26, the respective cell stacks 12 can be stably operated.

By employing a configuration in which the internal heating device 23 is covered by the external heating device 24, a heat retention effect in the reaction containment 11 can be improved.

Figure 6:
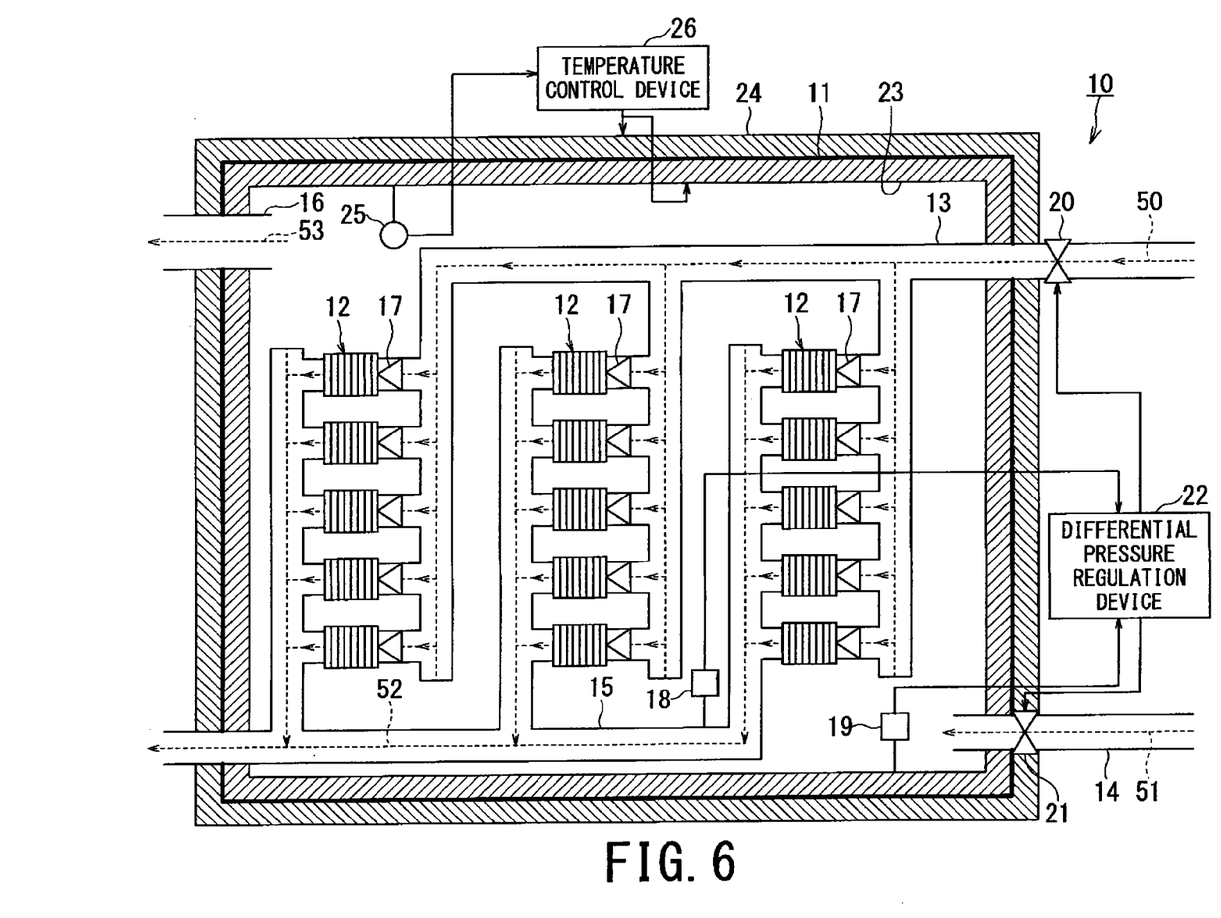
FIG. 6 is a configuration diagram illustrating a modification of the hydrogen production system according to the second embodiment.

FIG. 6 shows a modification of the hydrogen production system 10 according to the second embodiment. The first pressure sensor 18 may measure a pressure inside the hydrogen outlet path 15 to monitor a pressure inside the cell stacks 12 as the first embodiment (shown in FIG. 2).

Third Embodiment

Figure 7:
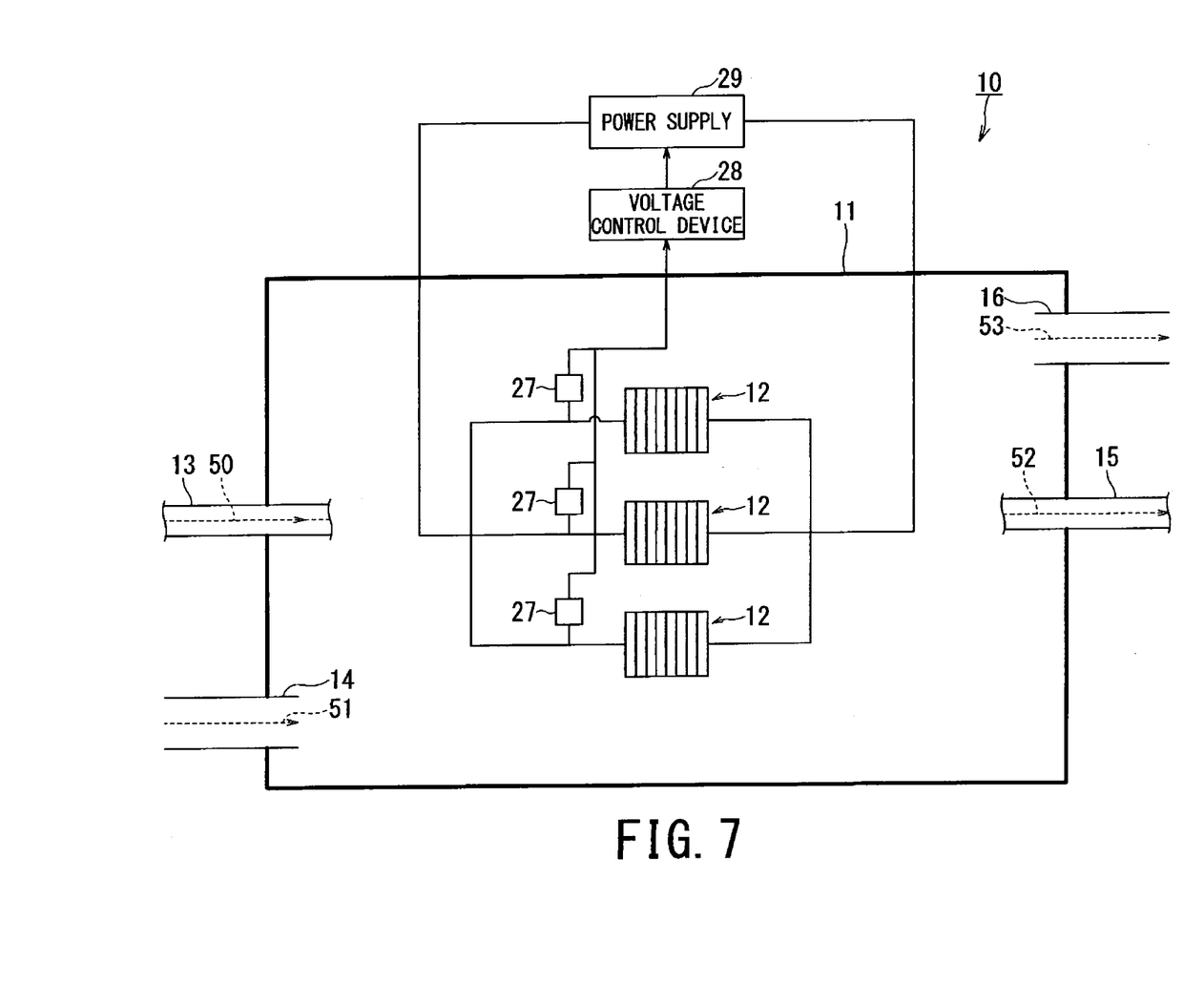
FIG. 7 is a configuration diagram of a hydrogen production system according to a third embodiment.

FIG. 7 is a configuration diagram of the hydrogen production system 10 according to a third embodiment. Note that a configuration of FIG. 7 is partially similar to that of FIG. 1, such as a configuration in which the steam 50 is caused to flow into the cell stacks 12 through the first flow path 13, and is thus shown and described in a simplified manner.

The cell stacks 12 are connected in parallel with a power supply 29 that applies a voltage to the cell stacks 12.

By connecting the cell stacks 12 in parallel with the power supply 29, an equal voltage is applied to the respective cell stacks 12, so that voltage control of the cell stacks 12 becomes easy. A configuration may be employed in which the plurality of cell stacks 12 are connected in series, and a plurality of rows of the cell stacks 12 connected in series are connected in parallel.

A ammeter 27 is a meter that measures a current flowing through each of the cell stacks 12 connected in parallel. FIG. 7 shows merely one example of a method for installing the ammeters 27. Since the reaction containment 11 has a high temperature, it is desirable that the ammeters 27 are installed outside the reaction containment 11 by drawing a cable for measuring a current out of the reaction containment 11.

Values of the currents flowing through the respective cell stacks 12, which are measured in the ammeters 27, are inputted into a voltage control device 28. The voltage control device 28 calculates a resistance value of the cell stacks 12 corresponding to a minimum current value out of the measured current values.

The voltage control device 28 calculates a resistance value of the cell stacks 12 corresponding to a minimum current value out of the measured current values.

The voltage control device 28 adjusts the voltage to be applied to the cell stacks 12 so as to obtain a predetermined current value (a proper current value flowing through the cell stacks 12) by using the calculated resistance value.

Electrical resistance values of the cell stacks 12 have an inherent variation, and also vary depending on the internal temperature of the reaction containment 11. The voltage control device 28 calculates the resistance value from the lowest current value (the cell having high electrical resistance and low efficiency), and adjusts the voltage to be applied to the cell stacks 12 based on the calculated resistance value.

Accordingly, the variability of electrolysis between the cell stacks 12 can produce the target amount of hydrogen.

In some embodiment, variable resistances may be inserted to each of cell stacks 12 in series. By the voltage control device 28 adjusting resistance values according to the variability of current values measured in cell stacks 12, the current flowing cell stacks 12 can become uniform.

Fourth Embodiment

Figure 8:
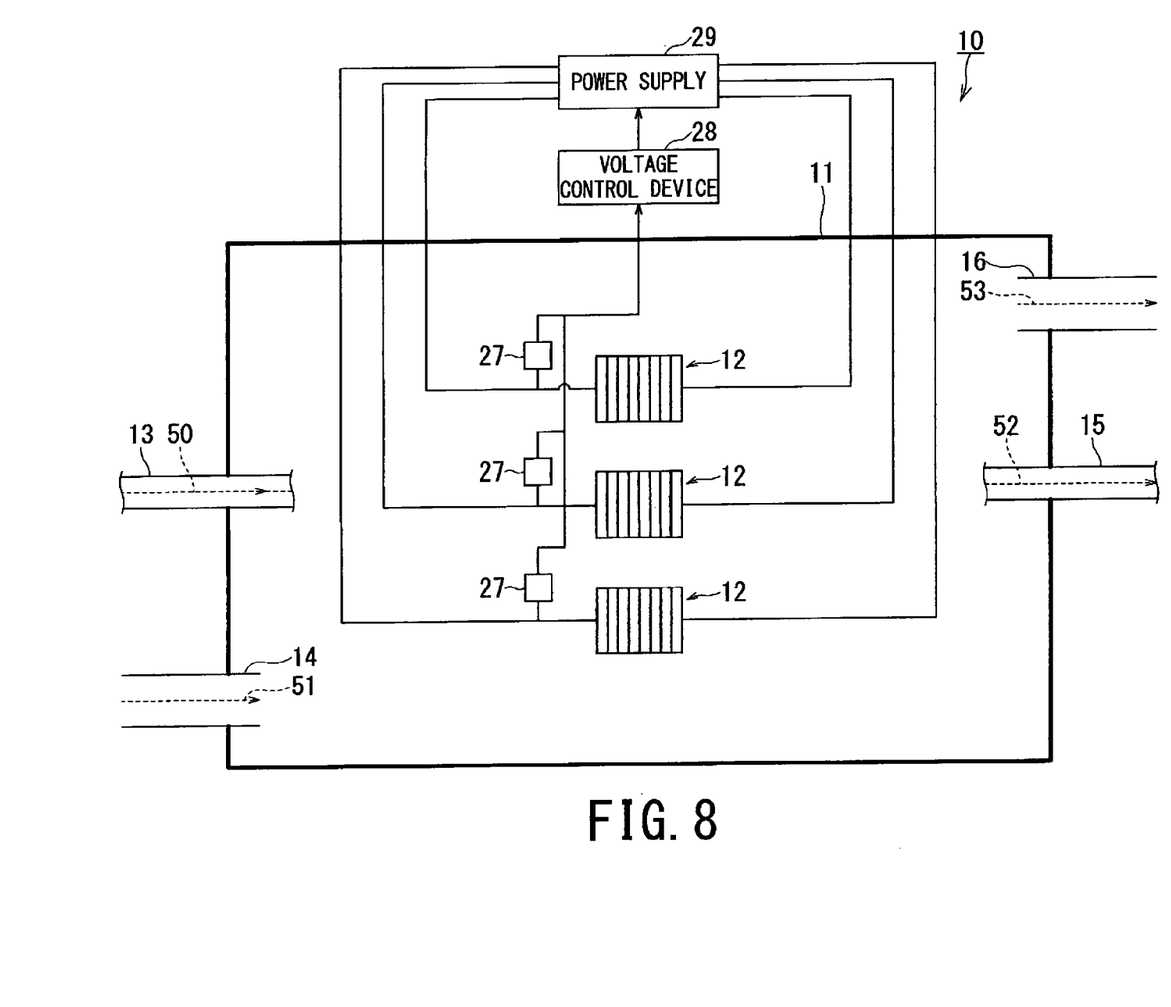
FIG. 8 is a configuration diagram of a hydrogen production system according to a fourth embodiment.

FIG. 8 is a configuration diagram of the hydrogen production system 10 according to a third embodiment. Note that a configuration of FIG. 8 is partially similar to that of FIG. 1, such as a configuration in which the steam 50 is caused to flow into the cell stacks 12 through the first flow path 13, and is thus shown and described in a simplified manner.

In fourth Embodiment, voltages from the power supply 29 are respectively applied to each of the cell stacks 12. Voltages applied to each of the cell stacks 12 are respectively controlled by the voltage control device 28.

The ammeter 27 is a meter that measures a current flowing through each of the cell stacks 12.

The voltage control device 28 calculates a resistance value of the cell stacks out of the measured current values. The voltage control device 28 adjusts voltages to be applied to each of the cell stacks 12 so as to become same current value flowing thorough each of the cell stacks 12.

By the current flowing through cell stacks 12 becoming uniform the variability of electrolysis between the cell stacks 12 is reduced, and the hydrogen production operation can be high-efficiently performed.

Fifth Embodiment

Figure 9:
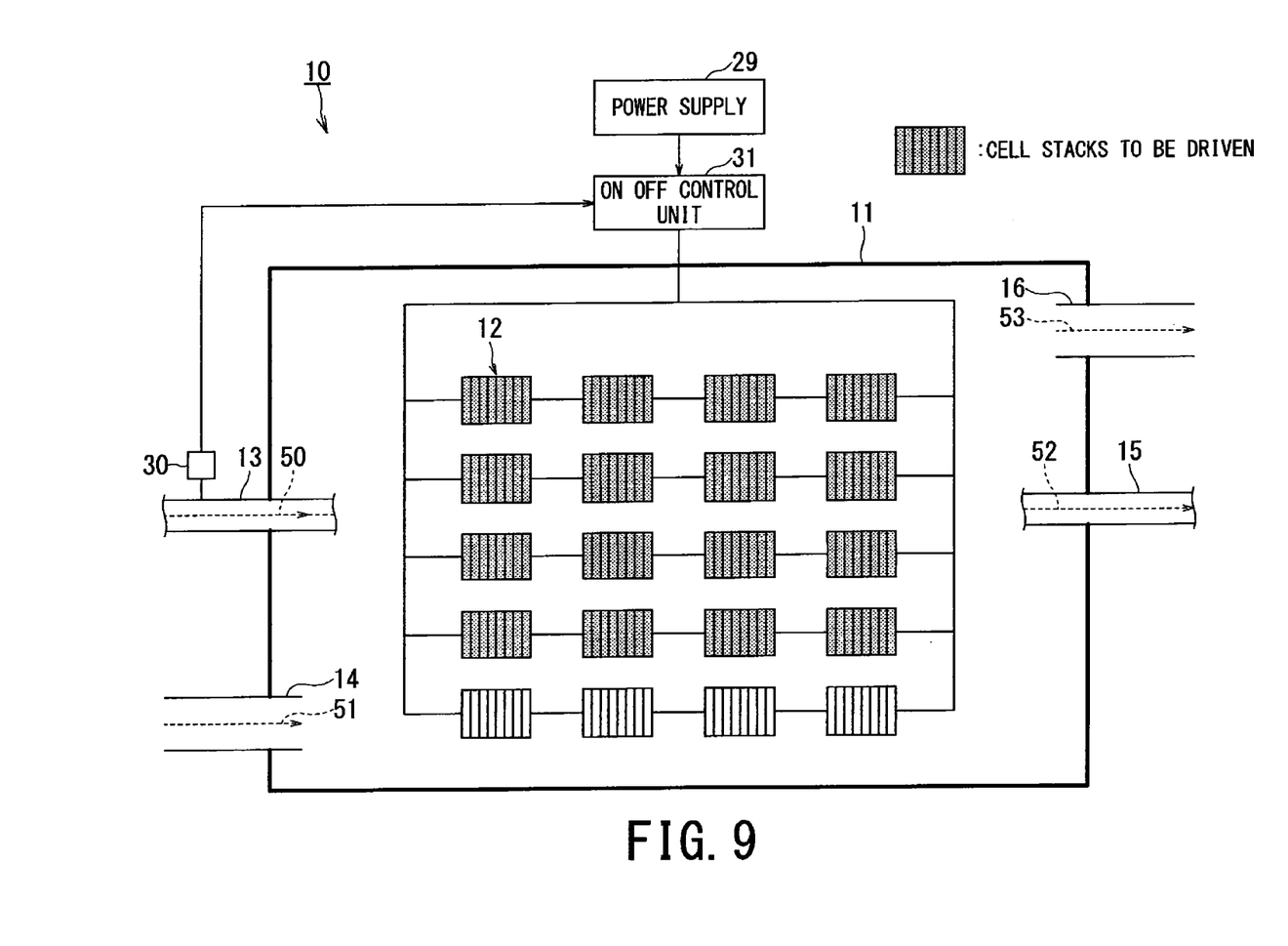
FIG. 9 is a configuration diagram of a hydrogen production system according to a fifth embodiment.

FIG. 9 is a configuration diagram of the hydrogen production system 10 according to a fourth embodiment. Note that a configuration of FIG. 6 is partially similar to that of FIG. 1, such as the configuration in which the steam 50 is caused to flow into the cell stacks 12 through the first flow path 13, and is thus shown and described in a simplified manner.

A flow meter 30 is provided on the first flow path 13, and measures the flow rate of the steam 50 flowing through the first flow path 13.

The measured flow rate of the steam 50 is inputted into a on off control unit 31. The on off control unit 31 selects the cell stack 12 to be driven by applying a voltage from the power supply 29 according to the measured flow rate of the steam 50.

To be more specific, the number of the cell stacks 12 to be driven is determined in proportion to the measured flow rate of the steam 50, and a voltage is applied to the cell stacks 12 corresponding to the driving number from the power supply 29.

The on off control unit 31 may select any cell stacks 12 according to the driving number. When the plurality of rows of the cell stacks 12 connected in series are connected in parallel with the power supply 29, the on off control unit 31 may select each of the rows of the cell stacks 12 to be driven from the plurality of rows.

Figure 10A:
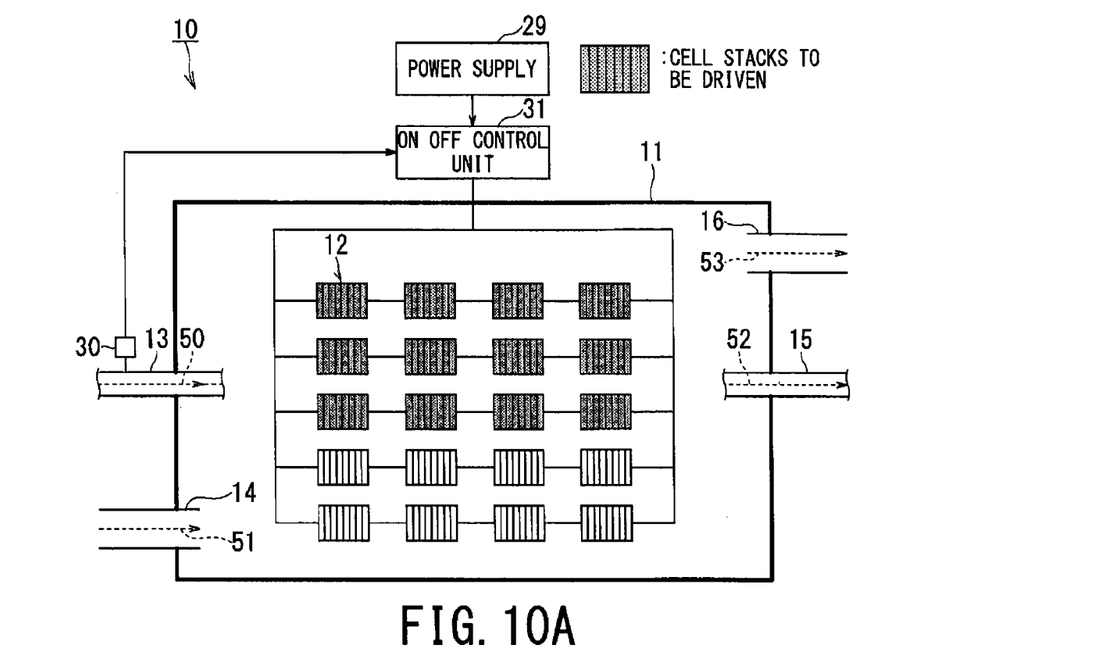
FIG. 10A is an explanatory view illustrating a case in which three rows of cell stacks are driven according to a steam rate.
Figure 10B:
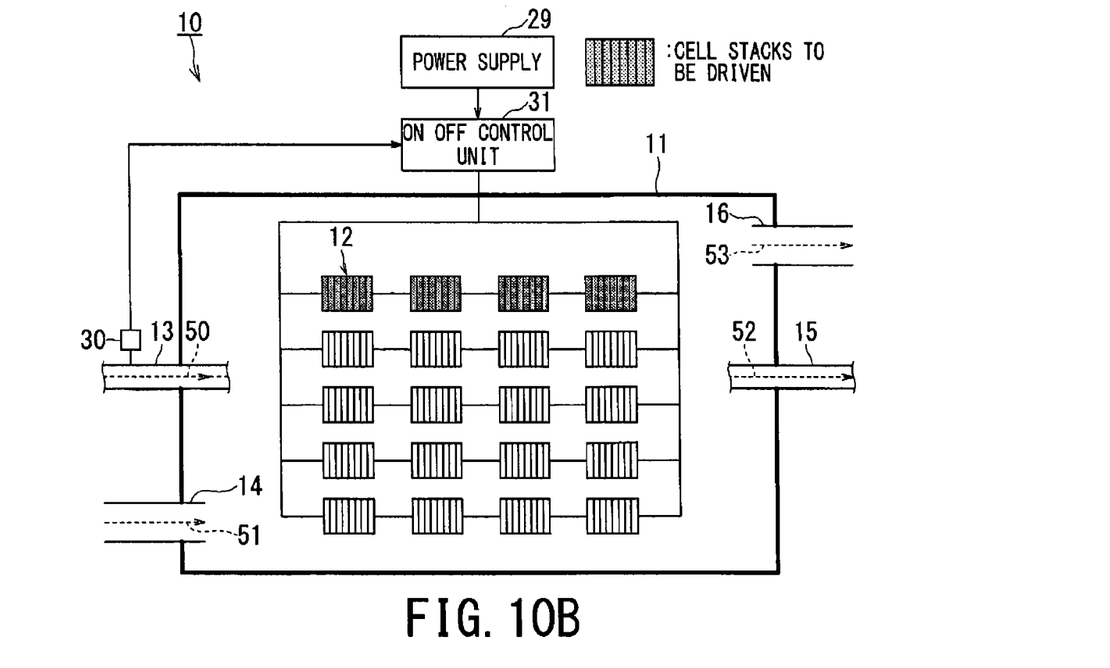
FIG. 10B is an explanatory view illustrating a case in which one row of cell stacks is driven according to a steam rate.

FIG. 7A shows a case in which three rows of the cell stacks 12 are driven according to the flow rate of the steam 50, and FIG. 7B shows a case in which one row of the cell stacks 12 is driven according to the steam rate.

By selecting the cell stacks 12 to be driven according to the supplied steam rate, it is possible to prevent the cell stacks 12 from being operated in a steam starvation state. By selecting each of the rows of the cell stacks 12 connected in parallel, it is possible to quickly address a variation in the steam rate.

In accordance with the hydrogen production system of the aforementioned respective embodiments, by providing the flow regulation device that regulates the flow rate of the steam caused to flow into each of the cell stacks to be uniform, high durability and high hydrogen production efficiency can be achieved even when hydrogen is produced by using the plurality of cell stacks.

The embodiments of the present invention have thus been described. However, the embodiments have been presented as examples, which are not intended to limit the scope of the invention. The novel embodiments can be implemented in various other modes. Various omissions, replacements, and changes may be made within the scope without departing from the gist of the invention. The embodiments and modifications are encompassed by the scope and gist of the invention, and included in the invention described in claims and the equivalent scope thereof.

Each function of the differential pressure control device 22, the temperature control device 26, the voltage control device 28, and the on off control unit 31 may also be configured so as to be implemented by executing a predetermined program code using an electronic circuit such as a processor, or without being limited to such software processing, a unit or computer implemented by hardware processing using an electronic circuit such as an ASIC or may be configured as a unit or computer implemented by combining software processing and hardware processing.

What is claimed is:

1. A hydrogen production system comprising:
    a plurality of cell stacks provided within a reaction containment, the cell stacks generating hydrogen by high temperature steam electrolysis by supplying steam to the plurality of cell stacks;
    a first flow path guiding the steam to each of the cell stacks;
    a second flow path causing a carrier gas containing air as a main component to flow into the reaction containment; and
    a flow regulation device provided at an inlet of the steam in each of the cell stacks, the flow regulation device regulating a flow rate of the steam caused to flow into each of the cell stacks to be uniform.

2. The hydrogen production system according to claim 1, further comprising:
    a first pressure sensor measuring a pressure inside the first flow path or an outlet path of generated hydrogen;
    a second pressure sensor measuring a pressure inside the reaction containment;
    a first flow control valve provided in the first flow path to regulate a flow rate of the steam flowing through the first flow path;

a second flow control valve provided in the second flow path to regulate a flow rate of the carrier gas flowing through the second flow path; and a differential pressure control device calculating a differential pressure between an inside and an outside of the cell stacks based on values of the pressures measured in the first pressure sensor and the second pressure sensor, and regulating the respective flow rates of the steam and the carrier gas by using the first flow control valve and the second flow control valve so as to make the differential pressure equal to or less than a predetermined pressure value.

3. The hydrogen production system according to claim 1, wherein a pressure drop of the steam caused by the flow regulation device is larger than a pressure drop caused by flow resistance of the cell stacks.

4. The hydrogen production system according to claim 1, further comprising:
an internal heater provided on an inner peripheral surface of the reaction containment to heat an inside of the reaction containment;
an external heater provided on an outer peripheral surface of the reaction containment to heat the inside of the reaction containment;
a thermometer measuring an internal temperature of the reaction containment; and
a temperature control device adjusting the internal temperature of the reaction containment to be a predetermined temperature by using the internal heater and the external heater.

5. The hydrogen production system according to claim 1, wherein the cell stacks are connected in parallel with a power supply that applies a voltage to the cell stacks.

6. The hydrogen production system according to claim 1, further comprising:
an ammeter measuring a value of a current flowing through each of the cell stacks connected in parallel; and
a voltage control device calculating a resistance value of the cell stacks corresponding to a minimum current value out of the measured current values, and adjusting the voltage to be applied to the cell stacks so as to obtain a predetermined current value.

7. The hydrogen production system according to claim 1, further comprising:
an ammeter measuring a value of a current flowing through each of the cell stacks, wherein voltages from a power supply is respectively applied to each of the cell stacks; and
a voltage control device calculating a resistance value of the cell stacks out of the measured current values, and adjusting the voltages to be applied to each of the cell stacks so as to become same current flowing thorough each of the cell stacks.

8. The hydrogen production system according to claim 1, further comprising:
a flow rate meter measuring the flow rate of the steam flowing through the first flow path;
an on off control unit selecting the cell stack to be driven according to the measured flow rate of the steam.

9. The hydrogen production system according to claim 8, wherein a plurality of rows of the cells stacks connected in series are connected in parallel with the power supply, and the on off control unit selects each of the rows of the cell stacks to be driven from the plurality of rows.

10. The hydrogen production system according to claim 1, wherein the cell stacks are radially arranged within the reaction containment, and the first flow path guides the steam from a center of the radially-arranged cell stacks.

11. A method for producing hydrogen by using a plurality of cell stacks that are provided within a reaction containment, and generate hydrogen by high temperature steam electrolysis by supplying steam to the plurality of cell stacks, comprising the steps of:
guiding the steam to each of the cell stacks;
causing a carrier gas containing air as a main component to flow into the reaction containment; and
regulating a flow rate of the steam caused to flow into each of the cell stacks to be uniform by using a flow regulation device that is provided at an inlet of the steam in each of the cell stacks.

* * * * *